(12) United States Patent
Ohno et al.

(10) Patent No.: US 12,510,468 B2
(45) Date of Patent: Dec. 30, 2025

(54) NON-TRANSITORY STORAGE MEDIUM, OPTICAL INSPECTION SYSTEM, PROCESSING APPARATUS FOR OPTICAL INSPECTION SYSTEM, AND OPTICAL INSPECTION METHOD

(71) Applicant: KABUSHIKI KAISHA TOSHIBA, Tokyo (JP)

(72) Inventors: Hiroshi Ohno, Tokyo (JP); Hiroya Kano, Kawasaki Kanagawa (JP); Hideaki Okano, Yokohama Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 344 days.

(21) Appl. No.: 18/174,367

(22) Filed: Feb. 24, 2023

(65) Prior Publication Data

US 2024/0094115 A1    Mar. 21, 2024

(30) Foreign Application Priority Data

Sep. 16, 2022    (JP) .................................. 2022-148457

(51) Int. Cl.
*G01N 21/31* (2006.01)
*G06T 5/10* (2006.01)
(Continued)

(52) U.S. Cl.
CPC ............... *G01N 21/31* (2013.01); *G06T 5/10* (2013.01); *G06T 5/20* (2013.01); *G06T 5/73* (2024.01);
(Continued)

(58) Field of Classification Search
None
See application file for complete search history.

(56) References Cited

U.S. PATENT DOCUMENTS 5,675,407 A    10/1997   Geng
10,732,102 B2    8/2020   Ohno et al.
(Continued)

FOREIGN PATENT DOCUMENTS

JP    2008-516299 A    5/2008
JP    2014-126903 A    7/2014
(Continued)

OTHER PUBLICATIONS

Ohno, H., Kamikawa, T. One-shot BRDF imaging system to obtain surface properties. Opt Rev 28, 655â661 (2021). https://doi.org/10.1007/s10043-021-00689-x. Published Aug. 6, 2021. (Year: 2021).*
(Continued)

*Primary Examiner* — Sj Park
*Assistant Examiner* — Caroline E. Depalma
(74) *Attorney, Agent, or Firm* — Finnegan, Henderson, Farabow, Garrett & Dunner, LLP

(57) ABSTRACT

According to an embodiment, a non-transitory storage medium stores an optical inspection program. The optical inspection program causes a processor to execute generating a wavelength selection portion-removed image by removing, from a captured image of an object surface imaged (Continued)

through a wavelength selection portion configured to select at least two different wavelength spectra from incident light, an image of the wavelength selection portion included in the captured image.

14 Claims, 10 Drawing Sheets

(51) Int. Cl.
  *G06T 5/20* (2006.01)
  *G06T 5/73* (2024.01)
  *G06T 7/00* (2017.01)
(52) U.S. Cl.
  CPC .. *G06T 7/0008* (2013.01); *G06T 2207/10152* (2013.01); *G06T 2207/20048* (2013.01)

(56) References Cited

U.S. PATENT DOCUMENTS

| 2007/0279618 | A1 | 12/2007 | Sano et al. |
| 2014/0176760 | A1 | 6/2014 | Taguchi et al. |
| 2016/0202048 | A1 | 7/2016 | Meng et al. |
| 2018/0232596 | A1* | 8/2018 | Gal-Yam ............. G06V 10/443 |
| 2022/0121869 | A1* | 4/2022 | Miura ...................... G06T 7/11 |

FOREIGN PATENT DOCUMENTS

| JP | 2016-128816 A | 7/2016 |
| JP | 2018-128436 A | 8/2018 |
| JP | 6818702 B2 | 1/2021 |
| JP | 2022-68055 A | 5/2022 |

OTHER PUBLICATIONS

Walton L. Howes, "Rainbow schlieren and its applications," Applied Optics, vol. 23, No. 14, pp. 2449-2460 (1984).

Hiroshi Ohno et al., "One-shot BRDF imaging system to obtain surface properties," Optical Review, vol. 28, pp. 655-661, https://doi.org/10.1007/s10043-021-00689-x (2021).

Japan Patent Office, Office Action in JP App. No. 2022-148457 (Nov. 11, 2025).

Hiroshi OHNO et al., "Imaging Technology to Immediately Obtain Clear Images of Microdefects," Toshiba Review, vol. 76, No. 6, pp. 38-41 (Nov. 2021).

* cited by examiner

NON-TRANSITORY STORAGE MEDIUM, OPTICAL INSPECTION SYSTEM, PROCESSING APPARATUS FOR OPTICAL INSPECTION SYSTEM, AND OPTICAL INSPECTION METHOD

CROSS-REFERENCE TO RELATED APPLICATIONS

This application is based upon and claims the benefit of priority from Japanese Patent Application No. 2022-148457, filed Sep. 16, 2022, the entire contents of all of which are incorporated herein by reference.

FIELD

Embodiments described herein relate generally to a non-transitory storage medium, an optical inspection system, a processing apparatus for the optical inspection system, and an optical inspection method.

BACKGROUND

In various industries, surface inspection of an object in a noncontact state is important. As a conventional method, there exists a method in which an object is illuminated with spectrally divided light beams, an imaging element acquires each spectrally divided image, and the direction of each light beam is estimated, thereby acquiring the information of the object surface.

DETAILED DESCRIPTION

Figure 1:
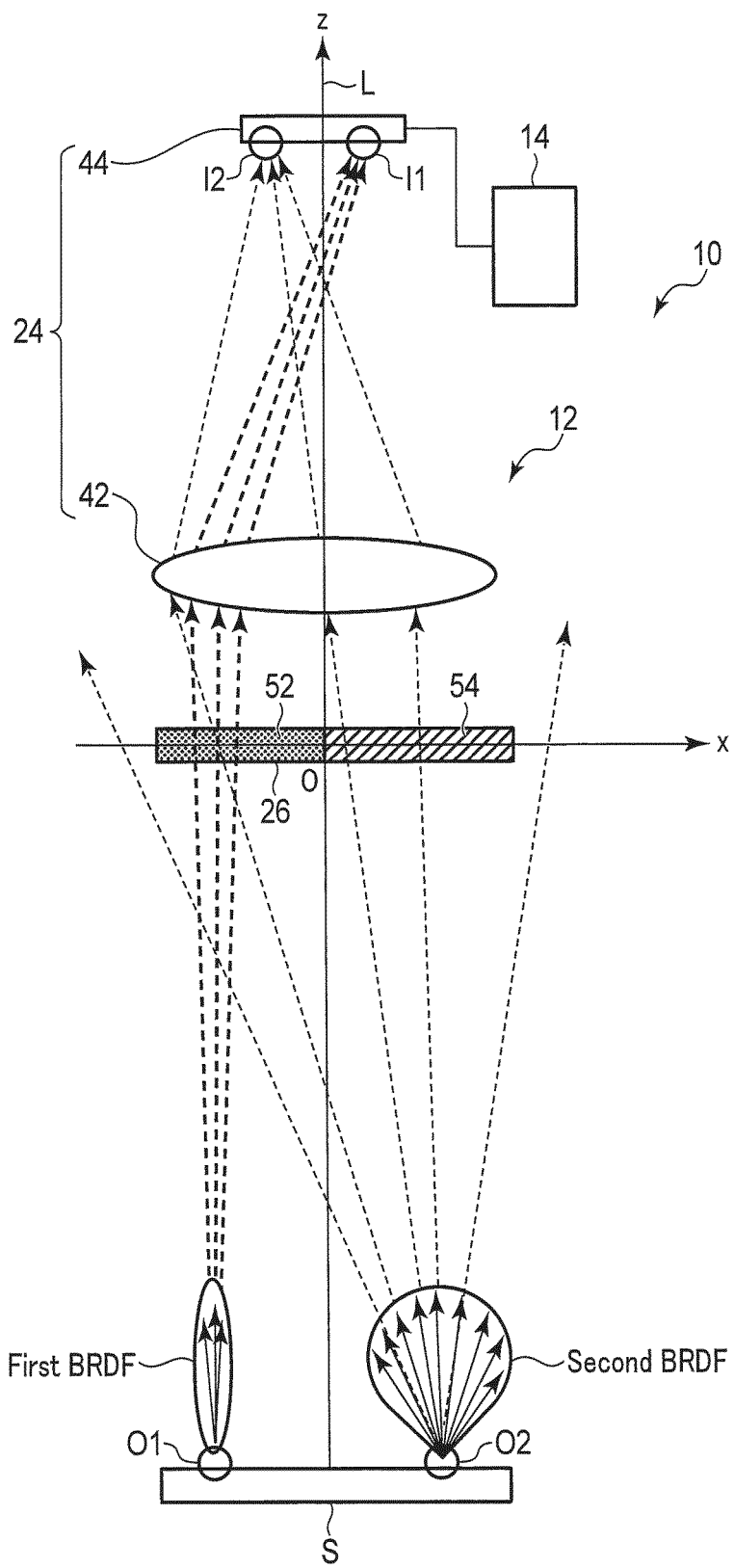
FIG. 1 is a schematic view showing an optical inspection system according to a first embodiment.

It is an object of an embodiment to provide a non-transitory storage medium storing an optical inspection program, an optical inspection system, a processing apparatus for the optical inspection system, and an optical inspection method for removing the image of a wavelength selection portion included in an image at the time of BRDF acquisition.

According to the embodiment, a non-transitory storage medium stores an optical inspection program. The optical inspection program causes a processor to execute generating a wavelength selection portion-removed image by removing, from a captured image of an object surface imaged through a wavelength selection portion configured to select at least two different wavelength spectra from incident light, an image of the wavelength selection portion included in the captured image.

Embodiments will now be described with reference to the accompanying drawings. The drawings are schematic or conceptual, and the relationship between the thickness and the width of each part, the size ratio between parts, and the like do not always match the reality. Also, even same portions may be illustrated in different sizes or ratios depending on the drawing. In the present specification and the drawings, the same elements as described in already explained drawings are denoted by the same reference numerals, and a detailed description thereof will appropriately be omitted.

First Embodiment

An optical inspection system 10 according to the first embodiment will be described with reference to FIGS. 1 to 3.

In this specification, light is a kind of electromagnetic wave, and includes X rays, ultraviolet rays, visible light, infrared rays, microwaves, and the like. That is, any electromagnetic wave can be used as long as it can be expressed by Maxwell's equations. In this embodiment, it is assumed that the light is visible light and for example, the wavelength falls in a region of 400 nm to 750 nm.

Figure 2:
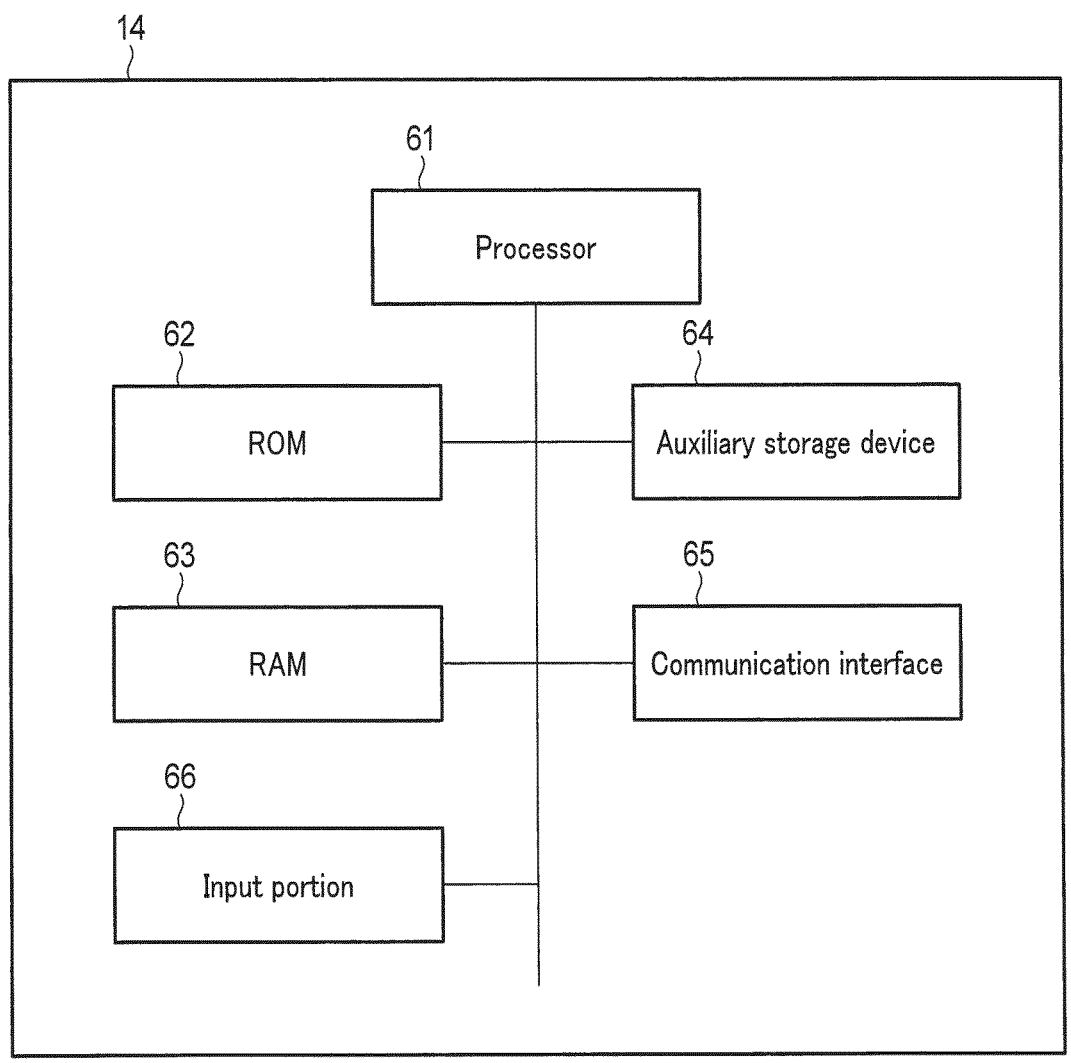
FIG. 2 is a schematic block diagram of the processing apparatus of the optical inspection system.

FIG. 1 is a schematic sectional view showing the optical inspection system 10 according to this embodiment.

The optical inspection apparatus 10 according to this embodiment includes an optical apparatus 12 and a processing apparatus 14.

The optical apparatus 12 includes an imaging portion 24 and a wavelength selection portion (multiwavelength opening) 26.

The imaging portion 24 is directed to a portion where the surface of an object S is illuminated. The imaging portion 24 includes an imaging optical element 42 and an image sensor (color image sensor) 44. The imaging optical element 42 is, for example, an imaging lens. The imaging optical element 42 has a focal length f. In FIG. 1, the imaging lens is schematically drawn and represented by one lens, but may be a lens set formed by a plurality of lenses. Alternatively, the imaging optical element 42 may be a concave mirror, a convex mirror, or a combination thereof. That is, the imaging optical element 42 can be any optical element having a function of collecting, to a conjugate image point, that is, an object point on the image sensor 44, a light beam group traveling from one point of the object S. Collecting (condensing) a light beam group traveling from an object point on the surface of the object S to an image point by the imaging optical element 42 is called imaging, or transferring an object point to an image point (the conjugate point of the object point). In this manner, the object point and the image point have a conjugate relationship via the imaging optical element 42. The aggregate plane of conjugate points to which a light beam group traveling from a sufficiently apart object point is transferred by the imaging optical element 42 will be referred to as the focal plane of the imaging optical element 42. A line that is perpendicular to the focal plane and passes through the center of the imaging optical element 42 is defined as an optical axis L. A point at which the optical axis L crosses the focal plane will be referred to as a focal point.

Note that a direction along the optical axis L is defined as the z-axis, and an xyz orthogonal coordinate system is defined to have the x-axis orthogonal to the z-axis and the y-axis orthogonal to the x- and z-axes. In this case, the xyz coordinate system is defined with respect to the wavelength selection portion 26, and an origin O is set on the boundary between a first wavelength selection region 52 and a second wavelength selection region 54. The z-axis crosses the wavelength selection portion 26. The x-axis crosses the wavelength selection regions 52 and 54. The y-axis is along the wavelength selection regions 52 and 54. However, the y-axis is not limited to this and may cross a wavelength selection region other than the wavelength selection regions 52 and 54. That is, it is enough for the wavelength selection portion 26 that at least two wavelength selection regions cross the x-axis.

The image sensor 44 is arbitrary as long as it is formed by arranging side by side at least two pixels for converting light into an electrical signal. For example, the image sensor 44 can be an area sensor in which pixels are arranged in an area, or a line sensor in which pixels are arranged in a line.

The pixel of the image sensor 44 has at least two different color channels. The image sensor 44 can discriminate at least two different wavelengths at each pixel. That is, the image sensor 44 can discriminate the first and second wavelengths at each pixel. For example, the first wavelength is 450-nm blue light and the second wavelength is 650-nm red light. However, the wavelengths are not limited to them and are arbitrary. A color channel sensitive to the first wavelength will be referred to as a blue channel, and a color channel sensitive to the second wavelength will be referred to as a red channel. The image sensor 44 according to this embodiment may include three, R, G, and B color channels at each pixel. In this embodiment, each pixel can preferably further receive green light of a 550-nm wavelength by the independent color channel.

The wavelength selection portion 26 according to this embodiment has a stripe shape parallel to the y-axis. The wavelength selection portion 26 is provided between the surface of the object S and the imaging portion 24.

The wavelength selection portion 26 includes at least two wavelength selection regions 52 and 54. The two wavelength selection regions are defined as the first wavelength selection region 52 and the second wavelength selection region 54.

In this embodiment, the first wavelength selection region 52 and the second wavelength selection region 54 extend along, for example, the y-axis. The first wavelength selection region 52 and the second wavelength selection region 54 cross the x-axis.

The first wavelength selection region 52 is configured to transmit a light beam having a wavelength spectrum including the first wavelength. In this embodiment, the first wavelength selection region 52 can transmit a light beam of the first wavelength. Transmitting a light beam means heading a light beam from the object point to the image point by transmission or reflection. The first wavelength selection region 52 substantially shields a light beam of the second wavelength. Here, shielding means not transmitting a light beam. That is, this means not heading a light beam from the object point to the image point.

The second wavelength selection region 54 is configured to transmit a wavelength spectrum including a light beam of the second wavelength. In this embodiment, the second wavelength selection region 54 can transmit a light beam of the second wavelength. To the contrary, the second wavelength selection region 54 substantially shields a light beam of the first wavelength.

The wavelength selection portion 26 includes at least two wavelength selection regions 52 and 54 and thus has a pattern. This will be called a wavelength selection portion pattern or sometimes simply called the wavelength selection portion 26. When the surface of the object S is imaged by the imaging portion 24 through the wavelength selection portion 26, the wavelength selection portion pattern (or the wavelength selection portion 26) is projected and caught in the image.

The processing apparatus 14 includes, for example, a processor (controller) 61, a ROM (storage medium) 62, a RAM 63, an auxiliary storage device (storage medium) 64, a communication interface (communication portion) 65, and an input portion 66.

The processor 61 is the center part of a computer that performs processes such as calculation and control necessary for processing of the processing apparatus 14, and integrally controls the overall processing apparatus 14. The processor 61 executes control to implement various functions of the processing apparatus 14 based on programs such as system software, application software, or firmware stored in a non-transitory storage medium such as the ROM 62 or the auxiliary storage device 64. The processor 61 includes, for example, a CPU (Central Processing Unit), a MPU (Micro Processing Unit), a DSP (Digital Signal Processor), an ASIC (Application Specific Integrated Circuit), or an FPGA (Field Programmable Gate Array). Alternatively, the processor 61 is a combination of them. The processing apparatus 14 may include one or a plurality of processors 61.

The ROM 62 is equivalent to the main storage device of the computer whose center is the processor 61. The ROM 62 is a nonvolatile memory dedicated to read out data. The ROM 62 stores the above-mentioned programs. The ROM 62 stores data, various set values, or the like used to perform various processes by the processor 61.

The RAM 63 is equivalent to the main storage device of the computer whose center is the processor 61. The RAM 63 is a memory used to read out and write data. The RAM 63 is used as a so-called work area or the like for storing data to be temporarily used to perform various processes by the processor 61.

The auxiliary storage device 64 is equivalent to the auxiliary storage device of the computer whose center is the processor 61. The auxiliary storage device 64 is, for example, an EEPROM (Electrically Erasable Programmable Read-Only Memory)®, an HDD (Hard Disk Drive), or an SSD (Solid State Drive). The auxiliary storage device 64 sometimes stores the above-mentioned programs. The auxiliary storage device 64 saves data used to perform various processes by the processor 61, data generated by processing of the processor 61, various set values, and the like.

Programs stored in the ROM 62 or the auxiliary storage device 64 include programs for controlling the processing apparatus 14. For example, an optical inspection program is suitably stored in the ROM 62 or the auxiliary storage device 64.

The communication interface 65 is an interface for communicating with another apparatus through a wire or wirelessly via a network or the like, receiving various kinds of information transmitted from another apparatus, and transmitting various kinds of information to another apparatus. The processing apparatus 14 acquires image data obtained by the image sensor 44 via the communication interface 65.

The processing apparatus 14 preferably includes the input portion 66 such as a keyboard for inputting, for example, the arrangement of the wavelength selection portion 26 and selection of a type. The input portion 66 may input various kinds of information to the processor 61 wirelessly via the communication interface 65.

The processing apparatus 14 executes processing of implementing various functions by causing the processor 61 to execute programs or the like stored in the ROM 62 and/or the auxiliary storage device 64 or the like. Note that it is also preferable to store the control program of the processing apparatus 14 not in the ROM 62 and/or auxiliary storage device 64 of the processing apparatus 14, but in an appropriate server or cloud. In this case, the control program is executed while the server or the cloud communicates with, for example, the processor 61 of the optical inspection system 10 via the communication interface 65. That is, the processing apparatus 14 according to this embodiment may be provided in the optical inspection system 10 or in the server or cloud of systems at various inspection sites apart from the optical inspection system. It is also preferable to store the optical inspection program not in the ROM 62 or the auxiliary storage device 64 but in the server or the cloud, and execute it while the server or the cloud communicates with, for example, the processor 61 of the optical inspection system 10 via the communication interface 65. The processor 61 (processing apparatus 14) can therefore execute the optical inspection program (optical inspection algorithm) to be described later.

The processor 61 (processing apparatus 14) controls the acquisition timing of image data by the image sensor 44, acquisition of image data from the image sensor 44, and the like.

The basic operation of the above-described optical inspection system 10 will be explained.

Figure 3:
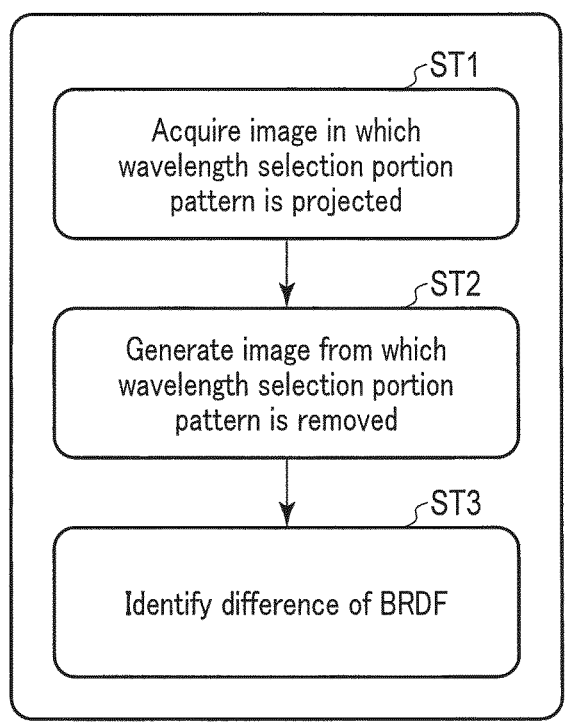
FIG. 3 is a schematic flowchart of processing to be performed by the processing apparatus of the optical inspection system shown in FIG. 1.

FIG. 3 is a flowchart showing the optical inspection program (optical inspection algorithm) to be executed by the processing apparatus 14 (processor 61) of the optical inspection system 10 according to this embodiment.

In the sequence of the optical inspection algorithm according to this embodiment, first, the processing apparatus 14 acquires an image in which the wavelength selection portion pattern is projected (step ST1).

In this embodiment, the processing apparatus 14 controls the image sensor 44 to acquire, as an image, light that has passed through the wavelength selection portion 26 and traveled from the surface of the object S.

The distribution of directions of reflected light beams from a point (to be referred to as an object point) on the surface of the object S can be represented by a distribution function called a BRDF (Bidirectional Reflectance Distribution Function). In general, the BRDF changes depending on the surface properties/shape. For example, if the surface is rough, reflected light spreads in various directions and the BRDF represents a wide distribution. That is, the reflected light exists at a wide angle. On the other hand, if the surface is a mirror surface, reflected light includes almost only specular reflection components, and the BRDF represents a narrow distribution. In this manner, the BRDF reflects the surface properties/shape of the object surface. Here, the surface properties/shape may be a surface roughness, fine unevenness on a micron order, tilt of the surface, or distortion. That is, any properties/shape concerning the height distribution of the surface can be used. If the surface properties/shape is formed by a fine structure, the typical structure scale can be any scale such as a nano scale, a micron scale, or a milli scale.

Hence, an image acquired by the processing apparatus 14 using the image sensor 44 includes the images of object points O1 and O2 on the surface of the object S. The captured image at this time includes the image of the wavelength selection portion 26 arranged between the imaging portion 24 and the surface of the object S. In the captured image, the colors of the wavelength selection regions 52 and 54 are added to the images of the object points O1 and O2 on the surface of the object S. In this image, the boundary between the wavelength selection regions 52 and 54 is, for example, visually recognized.

According to this embodiment, the wavelength spectrum of light acquired by the pixels of the image sensor 44 of the imaging portion 24 changes in accordance with the BRDF at the object points O1 and O2. For example, if the surface of the object S at the first object point O1 is flat, as shown in FIG. 2, the BRDF becomes a narrow distribution like the first BRDF. Light reflected at the first object point O1 passes through the first wavelength selection region 52 of the wavelength selection portion 26. That is, the light does not pass through the second wavelength selection region 54.

In contrast, if a minute defect exists on the surface of the object S at the second object point O2, the BRDF becomes a distribution wider than the first BRDF, like the second BRDF. The light reflected at the second object point O2 passes through both the first wavelength selection region 52 and the second wavelength selection region 54. Some light beams may deviate from the imaging portion 24 without passing through any of the wavelength selection regions 52 and 54 of the wavelength selection portion 26. If many light beams deviate from the imaging portion 24, the intensity of the light beam at an image point corresponding to the second object point O2 becomes low. As a result, the wavelength spectra of arriving light beams differ between image points corresponding to the first object point O1 and the second object point O2. If the wavelength spectra are different, colors acquired by the pixels of the image sensor 44 are also different. Accordingly, the processing apparatus 14 can identify the difference of the BRDF by color. If the processing apparatus 14 can identify the difference of the BRDF, the processing apparatus 14 can determine the presence/absence of a minute defect at the object points O1 and O2. It is generally known that if the surface properties/shape of the object S is different, the BRDF is also different. If the processing apparatus 14 can identify the difference of the BRDF, the processing apparatus 14 can identify the surface properties/shape of the object S.

The fact that the color of the pixel changes depending on the difference of the BRDF means that when an image of an arbitrary color channel is viewed, the pixel value changes depending on the difference of the BRDF. That is, an image of an arbitrary color channel has a contrast reflecting the difference of the BRDF. By identifying the contrast of an image of each color channel, the processing apparatus 14 can identify the difference of the BRDF. If the processing apparatus 14 can identify the difference of the BRDF, the processing apparatus 14 can identify the surface properties/shape of the object S.

The fact that the wavelength selection regions 52 and 54 through which light passes change depending on the difference of the BRDF means that when images of at least two color channels are viewed, the pixel values of the color channels at corresponding image points I1 and I2 correlatively change depending on the difference of the BRDF. For example, in a pixel in which the first BRDF of the first object point O1 is imaged, the pixel value of the blue channel increases and that of the red channel becomes almost 0. To the contrary, in a pixel in which the second BRDF of the second object point O2 is imaged, the pixel value of the blue channel decreases and that of the red channel correlatively increases. That is, the pixel values of the respective color channels correlatively change depending on the properties of the object point. With this correlation, the processing apparatus 14 can identify the difference of the BRDF. If the processing apparatus 14 can identify the difference of the BRDF, the processing apparatus 14 can identify the surface properties/shape of the object S.

In some cases, however, a color change by the pattern of the wavelength selection portion 26 caught in an image cannot be discriminated from a color change by the BRDF. That is, the wavelength selection portion pattern changes the pixel value in an image of an arbitrary color channel. This generates the contrast of each color channel. Alternatively, images of at least two color channels change correlatively depending on the wavelength selection portion pattern.

Then, the processing apparatus 14 generates an image (wavelength selection portion-removed image) from which the wavelength selection portion pattern is removed (step ST2).

To remove the wavelength selection portion pattern from the acquired image, for example, a surface of the object S having a uniform BRDF is prepared in advance and imaged by the imaging portion 24 through the wavelength selection portion 26. The processing apparatus 14 saves this image as a reference image in, for example, the ROM 62 and/or the auxiliary storage device 64, and subtracts the reference image from the acquired image in each color channel. For the reference image, the surface of the object S serving as a reference is arbitrary such as a monochrome mirror surface of the object S or a monochrome mat surface of the object S. Thus, the processing apparatus 14 can remove the wavelength selection portion pattern from the acquired image.

Finally, the processing apparatus 14 identifies the difference of the BRDF between the object points O1 and O2 using the image (image obtained by removing the wavelength selection portion pattern from the acquired image) (step ST3). That is, the processing apparatus 14 acquires information of the surface of the object S based on the wavelength selection portion-removed image.

A color change by the wavelength selection portion pattern is removed from the wavelength selection portion-removed image. In contrast, information of a color change by the BRDFs at the object points O1 and O2 on the surface of the object S remain. That is, the processing apparatus 14 can identify the BRDFs at the object points O1 and O2 by identifying information of the color change.

By removing the wavelength selection portion pattern from the acquired image, the processing apparatus 14 can identify the difference of the BRDF based on a change of each color channel without misidentifying that the difference of the BRDF arises from the wavelength selection portion pattern. If the processing apparatus 14 can identify the difference of the BRDF, the processing apparatus 14 can identify the surface properties/shape of the object S.

As described above, according to this embodiment, there can provide a non-transitory storage medium storing an optical inspection program, the optical inspection system 10, the processing apparatus 14 for the optical inspection system 10, and the optical inspection method for removing the image (wavelength selection portion pattern) of the wavelength selection portion 26 included in an image at the time of BRDF acquisition.

According to this embodiment, the processing apparatus 14 perform processing of removing the wavelength selection portion pattern from an acquired image so that the processing apparatus 14 can identify the BRDF based on a change of each color channel without misidentifying that the difference of the BRDF arises from the wavelength selection portion pattern.

Second Embodiment

An optical inspection system 10 according to the second embodiment will be described with reference to FIGS. 4 to 8. The second embodiment is a modification of the optical inspection system 10 according to the first embodiment. The same members as those described in the first embodiment or members having the same functions are denoted by the same reference numerals as much as possible, and a detailed description thereof will be omitted.

Figure 4:
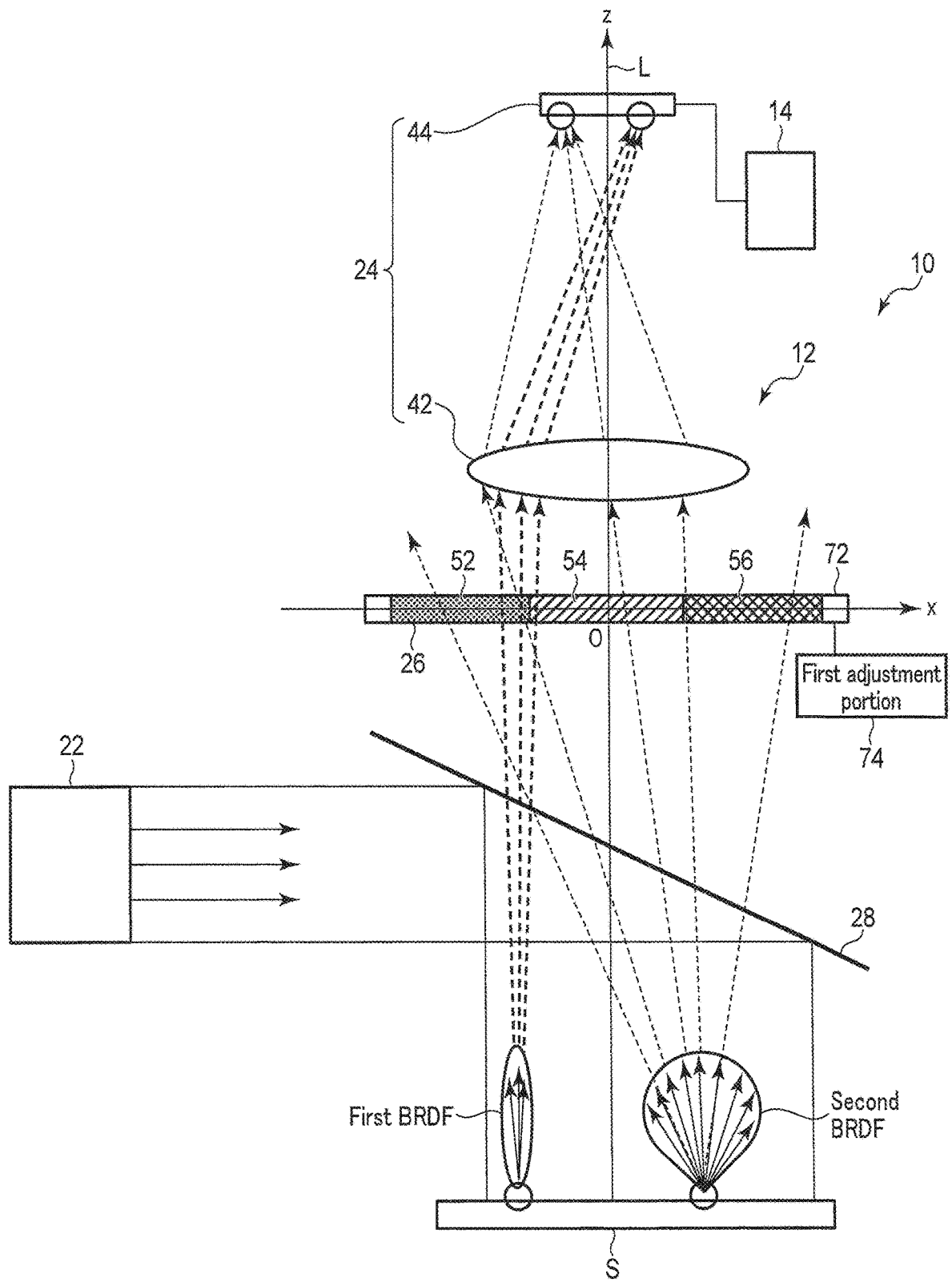
FIG. 4 is a schematic view showing an optical inspection system according to a second embodiment.

FIG. 4 is a sectional view showing the schematic x-z plane of an optical apparatus 12 of the optical inspection system 10 according to this embodiment. An optical axis L of an imaging optical element 42 of an imaging portion 24 of the optical apparatus 12 is defined as the z-axis. Axes orthogonal to the z-axis are defined as the x- and y-axes.

The basic arrangement of the optical apparatus 12 of the optical inspection system 10 according to the second embodiment is basically the same as that of the optical apparatus 12 of the optical inspection system 10 according to the first embodiment.

The optical apparatus 12 according to the second embodiment further includes an illumination portion 22 and a beam splitter 28, in addition to the optical apparatus 12 described in the first embodiment.

Although not shown, the illumination portion 22 includes a light source, an opening, an illumination lens, and the like. Any light source can be used as long as it radiates light. Here, the light source is, for example, an LED that emits white light. A processing apparatus 14 controls ON/OFF of light emission of the light source. The opening is implemented by a light shielding plate having a slit. The light source is arranged on the focal plane of the illumination lens. In this arrangement, light radiated from the LED is partially shielded by the opening and partially passes. In the sectional view shown in FIG. 4, light emitted from the illumination portion 22 substantially becomes parallel light. However, the parallel light may have an angle of divergence as small as several degrees. The light projected to a section other this section may not always be parallel light and may be divergent light.

The parallel light emitted from the illumination portion 22 irradiates the surface of an object S via the beam splitter 28.

The beam splitter 28 may be a polarization splitter or a non-polarization splitter. In the use of a polarization splitter, the polarization of light scattered by the surface of the object S is rotated, the light passes and enters the imaging portion 24. At this time, the imaging portion 24 can extract only scattered light.

In this embodiment, a wavelength selection portion 26 has three wavelength selection regions 52, 54, and 56. The three wavelength selection regions are the first wavelength selection region 52, the second wavelength selection region 54, and the third wavelength selection region 56.

The first wavelength selection region 52 is configured to transmit a light beam having a wavelength spectrum including the first wavelength. The first wavelength selection region 52 substantially shields light beams of the second and third wavelengths. However, the second and third wavelengths need not be completely shielded and it is enough to, for example, weaken their light intensities to be half or less.

The second wavelength selection region 54 is configured to transmit a wavelength spectrum including a light beam of the second wavelength. The second wavelength selection region 54 substantially shields light beams of the first and third wavelengths. However, the first and third wavelengths need not be completely shielded and it is enough to, for example, weaken their light intensities to be half or less.

The third wavelength selection region 56 is configured to transmit a wavelength spectrum including a light beam of the third wavelength. The third wavelength selection region 56 substantially shields light beams of the first and second wavelengths. However, the first and second wavelengths need not be completely shielded and it is enough to, for example, weaken their light intensities to be half or less.

In this embodiment, for example, the first wavelength is 450 nm of blue light, the second wavelength is 650 nm of red light, and the third wavelength is 550 nm of green light. However, the wavelengths are not limited to them and are arbitrary.

The image sensor 44 can be an area sensor or a line sensor. In this embodiment, the image sensor 44 is an area sensor and includes three color channels of red R, blue B, and green G. That is, the image sensor 44 can substantially receive 450-nm blue light, 650-nm red light, and 550-nm green light by the independent color channels. Note that the color channels need not be completely independent and each color channel may be slightly sensitive to wavelengths other than the corresponding wavelength.

In the xyz coordinate system according to this embodiment, the second wavelength selection region 54 is arranged at an origin O. The first wavelength selection region 52 is arranged adjacent to the second wavelength selection region 54 in the −x-axis. The third wavelength selection region 56 is arranged adjacent to the second wavelength selection region 54 in the +x-axis. The first wavelength selection region 52, the second wavelength selection region 54, and the third wavelength selection region 56 extend along the y-axis.

An optical inspection algorithm (program), which is executed by the processing apparatus 14 in the first embodiment, runs in the processing apparatus 14 of the optical inspection system 10 according to the second embodiment. Light beams projected to the section are schematically drawn.

The operation of the optical inspection system 10 according to this embodiment will be explained.

On the section shown in FIG. 4, the processing apparatus 14 causes the light source of the illumination portion 22 to emit light, and irradiates the surface of the object S with parallel light from the illumination portion 22. In this case, if the surface of the object S is a mirror surface, the parallel light is reflected. At this time, the first BRDF is a very narrow light distribution because of the parallel light. That is, the first BRDF can be a narrow light distribution in comparison with a case where the illumination is not parallel light but diffuse light. To the contrary, the second BRDF is a wide light distribution because of a minute defect on the surface of the object S. This also applies regardless of whether the illumination is parallel light or diffuse light. By emitting parallel light from the illumination portion 22, the optical inspection system 10 can make greatly different between the first BRDF and the second BRDF in the degree of spread of the light distribution. When light passes through the wavelength selection portion 26, the optical inspection system 10 can make greatly different between the wavelength spectra of the first and second BRDFs. That is, the optical inspection system 10 can increase the BRDF identification sensitivity, the optical inspection system 10 can improve the inspection precision.

Light expressed by the first BRDF passes through the first wavelength selection region 52, the second wavelength selection region 54, or the first wavelength selection region 52 and the second wavelength selection region 54. In this embodiment, light expressed by the first BRDF at an object point O1 is assumed to pass through the first wavelength selection region 52 and the second wavelength selection region 54. In contrast, light expressed by the second BRDF passes through, for example, the first wavelength selection region 52, the second wavelength selection region 54, and the third wavelength selection region 56.

Thus, light expressed by the first BRDF and light expressed by the second BRDF have different wavelength spectra. Also, light expressed by the first BRDF and light expressed by the second BRDF can be identified by pixels having three color channels. If the wavelength selection portion 26 does not have the third wavelength selection region 56, the processing apparatus 14 is difficult to discriminate between the first BRDF and the second BRDF. This is because light expressed by the first BRDF may pass through the vicinity of the boundary between the two adjacent wavelength selection regions 52 and 54.

This problem can be solved by the wavelength selection portion 26 having the three wavelength selection regions 52, 54, and 56 or more. That is, even if light passes through the vicinity of the boundary between the two adjacent wavelength selection regions 52 and 54, the processing apparatus 14 can identify different BRDFs without misidentifying them as the same BRDF as long as the wavelength selection portion 26 has the three wavelength selection regions 52, 54, and 56 or more.

Figure 5:
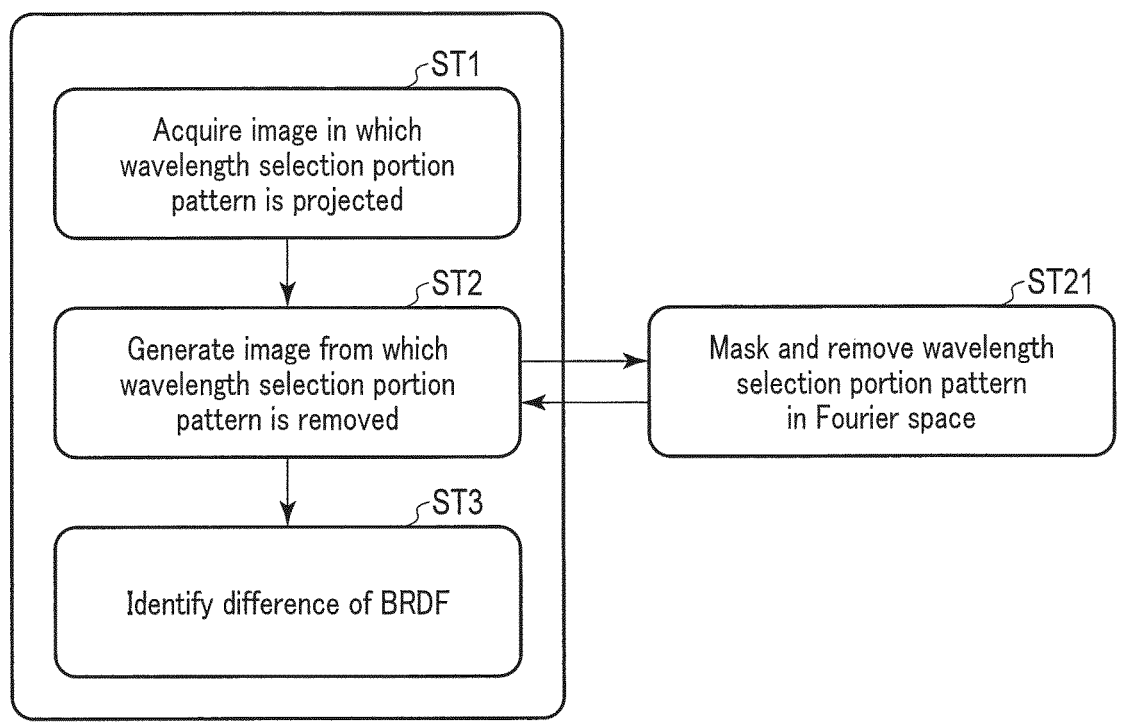
FIG. 5 is a schematic flowchart of processing to be performed by the processing apparatus of the optical inspection system shown in FIG. 4.

FIG. 5 is a flowchart showing an optical inspection algorithm (optical inspection program) to be executed by the processing apparatus 14 (processor 61) of the optical inspection system 10 according to this embodiment.

As described in the first embodiment, in the sequence of the optical inspection algorithm according to the second embodiment, first, the processing apparatus 14 acquires an image in which a wavelength selection portion pattern is projected (step ST1). The image acquired by the image sensor 44 includes the images of the object points O1 and O2 on the surface of the object S. The captured image at this time includes the image of the wavelength selection portion 26 arranged between the imaging portion 24 and the surface of the object S. In the captured image, the wavelength selection portion pattern is added as the colors of the wavelength selection regions 52 and 54 to the images of the object points O1 and O2 on the surface of the object S.

For example, the image of a region including a minute defect on a white plastic plate was captured by the imaging portion 24 through the wavelength selection portion 26 using the optical apparatus 12 shown in FIG. 4. An example of an actually captured acquired image is illustrated in the left view of FIG. 6. An image shown in FIG. 6 was obtained as an image of pixel values in which the vicinity of the y-axis in FIG. 6 was the boundary, red was strong on the upper side, and blue was strong on the lower side.

Then, the processing apparatus 14 generates an image (wavelength selection portion-removed image) from which the wavelength selection portion pattern is removed (step ST2).

In this embodiment, when the processing apparatus 14 generates an image from which the wavelength selection portion pattern is removed, the processing apparatus 14 Fourier-transforms an acquired image, and removes the wavelength selection portion pattern in the Fourier space. That is, the processing apparatus 14 removes a spatial frequency component corresponding to the wavelength selection portion pattern in the Fourier space.

By removing the spatial frequency component corresponding to the wavelength selection portion pattern in the Fourier space, the processing apparatus 14 can reliably remove the wavelength selection portion pattern at high precision regardless of the brightness of an acquired image (magnitude of an average pixel value). In applying a method of acquiring in advance a reference image and then removing it from an acquired image, the processing apparatus 14 need to match the brightnesses of the reference image and the acquired image each other. At this time, the processing apparatus 14 also needs to set properly the brightness of illumination at the time of image acquisition.

Figure 6:
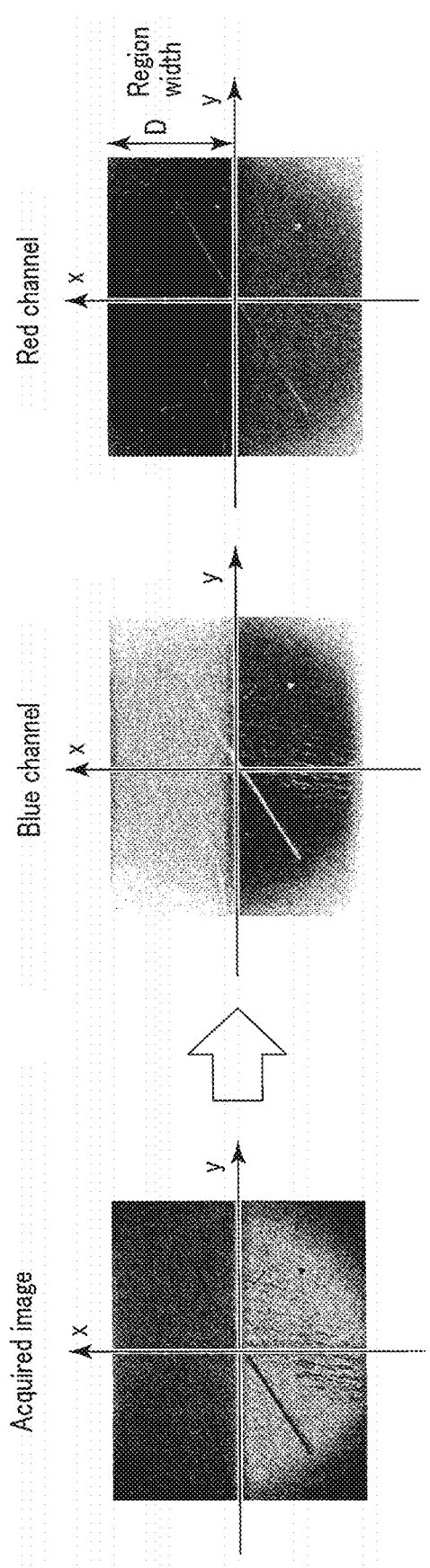
FIG. 6 shows an image acquired by the optical apparatus of the optical inspection system shown in FIG. 4, an image of a blue channel and an image of a red channel separated from the acquired image.

As shown in the right view of FIG. 6, the processing apparatus 14 separates an image of the blue channel and an image of the red channel from the acquired image. The image of the red channel will be described below. This also applies to the image of the blue channel.

The image of the red channel has two orthogonal axes in the x and y directions. In this image, the wavelength selection portion 26 caught in the image of the red channel is a rectangle having a constant large pixel value. This rectangle is defined as a region A, and the region has a width D in the x direction.

Figure 7:
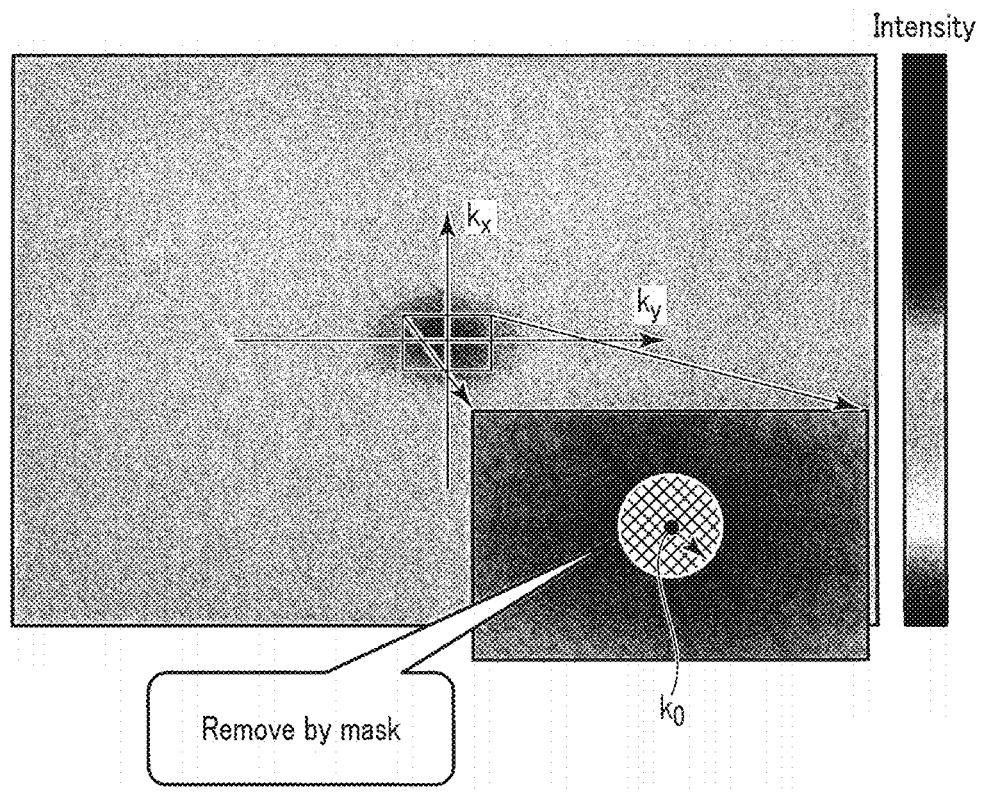
FIG. 7 shows a frequency space image upon transforming the image of the red channel shown in FIG. 6 into a Fourier space (frequency space) by two-dimensional Fourier transform, and an image showing mask processing.

The processing apparatus 14 transforms the image of the red channel into the Fourier space (frequency space) by two-dimensional Fourier transform. The image after Fourier transform is as shown in FIG. 7. This image is defined as a frequency space image (captured image of the red channel in the frequency space). The frequency space image has two orthogonal axes $k_x$ and $k_y$. An image in which the wavelength selection portion 26 is caught, that is, a main component corresponding to the region A exists within a radius $k_0$ from the center of the image. In this case, $k_0$ can be expressed using the region width D of the region A:

$$k_0 = 2\pi/D \quad (1)$$

The processing apparatus 14 sets, to be 0, the frequency space image in the region within the radius $k_0$. Alternatively, the processing apparatus 14 sets constant the frequency space image to be a much smaller value than the intensity (magnitude of the pixel value of the frequency space image) of the surroundings. That is, the processing apparatus 14 performs mask processing on the region within the radius $k_0$, and generates a wavelength selection portion-removed image in the frequency space.

Note that the image of the wavelength selection portion 26 is obtained as a component (low-frequency component) at a portion at which a change of the luminance value is gradual in the acquired image. A flaw or the like on the surface of the object S is obtained as a component (high-frequency component) at which a change of the luminance value is steep in the acquired image. Such an image in the frequency space generally has a low-frequency component near the center, and a higher-frequency component more distant from the center.

The processing apparatus 14 performs mask processing on the region of the radius $k_0$ from the center of the frequency space image, and performs cutting a low-frequency component of the frequency space image. That is, the processing apparatus 14 can function the mask processing similar to a high-pass filter (step ST21).

Figure 8:
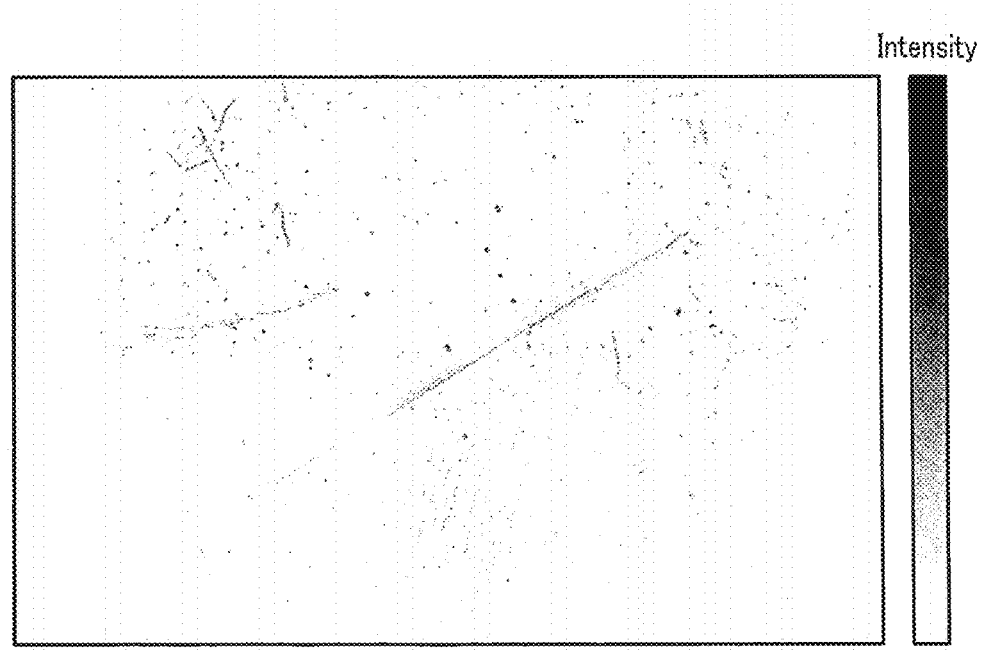
FIG. 8 shows a wavelength selection portion-removed image in a real space by inverse Fourier transform on the frequency space image after mask processing.

Then, the processing apparatus 14 performs inverse Fourier transform on the frequency space image (wavelength selection portion-removed image in the frequency space) after mask processing, returning the image to the real space. The processing apparatus 14 generates a wavelength selection portion-removed image (see FIG. 8) in the real space (step ST2). As shown in FIG. 8, the image of the wavelength selection portion 26 in the image acquired by the image sensor 44 shown in FIG. 6 can be removed in the wavelength selection portion-removed image in the real space. As is apparent from FIG. 8, the wavelength selection portion 26 caught in the image is removed and a minute defect is sharpened.

In this embodiment, the processing apparatus 14 performs processing on an image of the red channel, obtaining a wavelength selection portion-removed image in the real space. The processing apparatus 14 can similarly perform processing on an image of another color channel, that is, the blue channel here, obtaining a wavelength selection portion-removed image in a similar real space.

The processing apparatus 14 can perform the above-described processing on an image of the red channel and an image of the blue channel, removing the wavelength selection portion 26 caught in the images from both of the images, and sharpening a minute defect. By performing four arithmetic operations or the like to add and average them or multiply them, on these images, the processing apparatus 14 can make minute defect clearer than when the processing apparatus 14 performs processing using one image. Thus, the optical inspection system 10 enables high-precision inspection with respect to the surface of the object S.

Finally, as described in the first embodiment, the processing apparatus 14 identifies the difference of the BRDF between the object points O1 and O2 using the resultant image (image obtained by removing the wavelength selection portion pattern from the acquired image) (step ST3).

The optical apparatus 12 according to this embodiment includes a support portion 72 that supports the outer edge of the wavelength selection portion 26, and a first adjustment portion 74 capable of rotating the support portion 72 about the optical axis L.

Preferably, the first adjustment portion 74 uses, for example, a servomotor, is controlled by the processing apparatus 14 through a wire or wirelessly, and controls the arrangement of the support portion 72, that is, the arrangement of the wavelength selection portion 26 about the optical axis L (about the origin O). The first adjustment portion 74 can rotate the wavelength selection portion 26 with respect to the imaging portion 24 through a desired angle about, for example, the optical axis L. If the BRDF has a special anisotropy, the processing apparatus 14 can acquire a high-precision BRDF distribution by imaging the surface of the object S by the image sensor 44 while rotating the wavelength selection portion 26 about the optical axis L by the first adjustment portion 74.

The support portion 72 and the first adjustment portion 74 can also be used in the wavelength selection portion 26 of the optical apparatus 12 of the optical inspection system 10 described in the first embodiment.

According to this embodiment, there can provide a non-transitory storage medium storing an optical inspection program, the optical inspection system 10, the processing apparatus 14 for the optical inspection system 10, and the optical inspection method for removing the image (wavelength selection portion pattern) of the wavelength selection portion 26 included in an image at the time of BRDF acquisition.

(Modification)

The wavelength selection portion 26 caught in an image is sometimes much larger than the typical size of a minute defect to be inspected. In this case, the wavelength selection portion 26 projected in an image acquired by the image sensor 44 can also be removed by applying a spatial high-pass filter to a captured image.

Third Embodiment

The algorithm of an optical inspection system 10 and an inspection apparatus using it according to the third embodiment will be described with reference to FIGS. 9, 10, 11, and 12. The third embodiment is a modification of the optical inspection system 10 according to the first and second embodiments.

Figure 9:
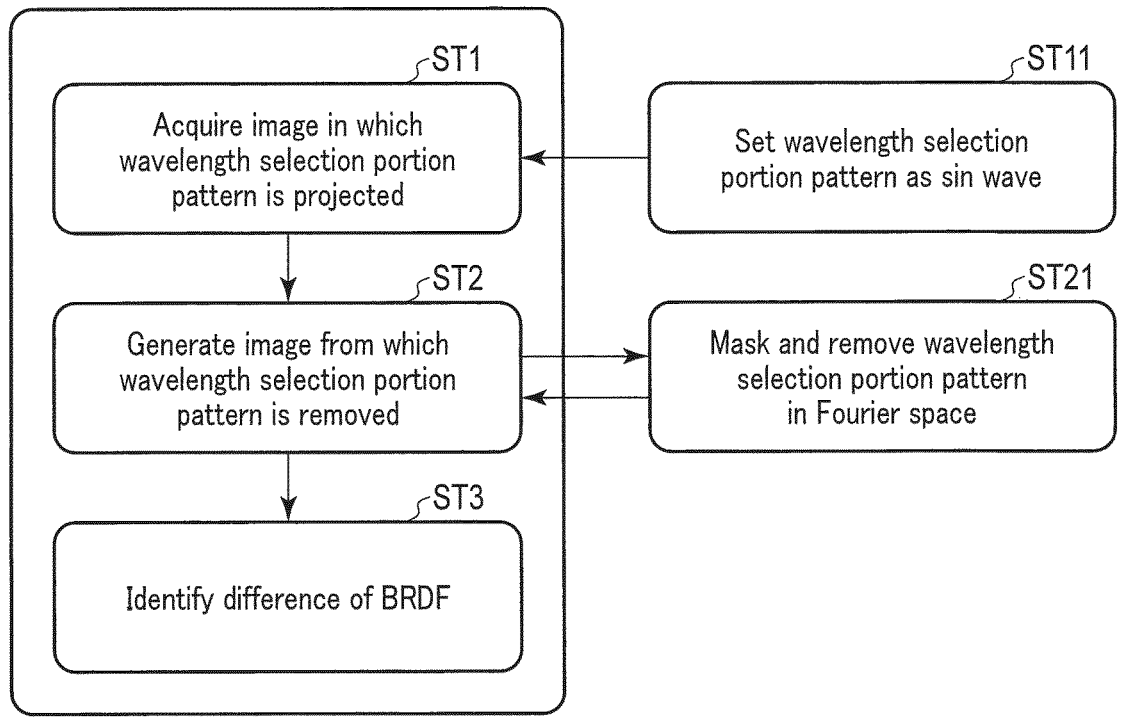
FIG. 9 is a schematic flowchart of processing to be performed by the processing apparatus of an optical inspection system according to a third embodiment.

FIG. 9 is a flowchart showing an optical inspection algorithm (optical inspection program) to be executed by a processing apparatus 14 (processor 61) of the optical inspection system 10 according to this embodiment.

In this embodiment, the processing apparatus 14 sets a sin wave as a wavelength selection portion pattern (step ST11). It is assumed that the wavelength selection portion pattern changes in the x direction and is uniform in the y direction, as shown in FIG. 4. The spatial frequency of the sin wave is defined as $k_{x0}$. The wavelength selection portion pattern being the sin wave means that, for example, a passing intensity (overall transmission intensity (transmittance) of a wavelength spectrum corresponding to blue in the case of a transmission wavelength selection region) when blue light passes through a wavelength selection portion 26 changes like the sin wave in the x direction. At the same time, this means that a passing intensity (overall transmission intensity (transmittance) of a wavelength spectrum corresponding to red in the case of a transmission wavelength selection region) when red light passes changes like the sin wave in the x direction. The phases (peak positions) and passing intensities of a sin wave with respect to blue light and a sin wave with respect to red light can be different. Here, sin waves are superimposed with a phase shift of 90°. Hence, blue weakly passes through a region through which red strongly passes, and red weakly passes through a region through which blue strongly passes.

Figure 10:
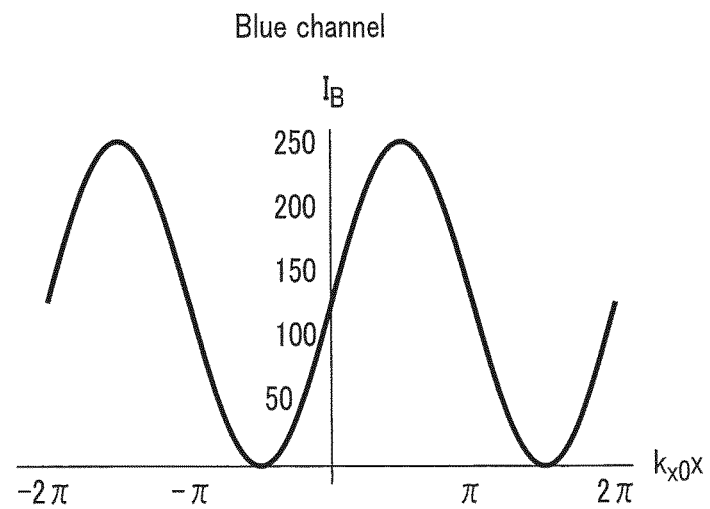
FIG. 10 is a graph of the blue channel in a case where the blue channel intensity is defined as an ordinate $I_B$ and the abscissa is defined as $k_{x0}*x$.
Figure 11:
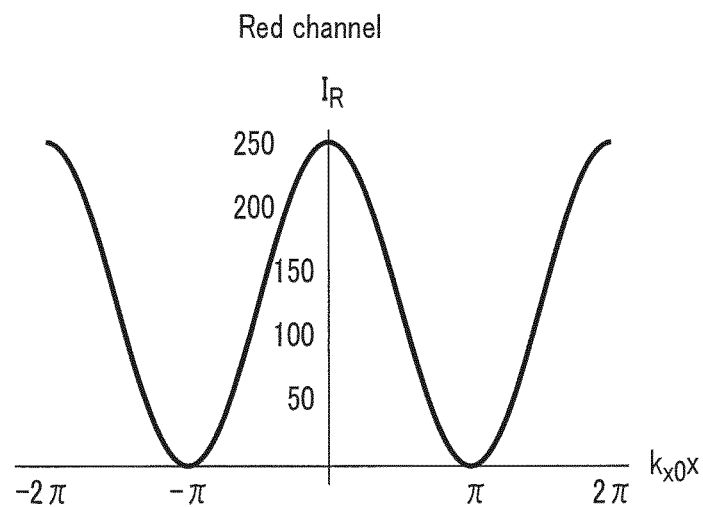
FIG. 11 is a graph of the red channel in a case where the red channel intensity is defined as an ordinate $I_R$ and the abscissa is defined as $k_{x0}*x$.

If the optical inspection system 10 images the surface of an object S through the wavelength selection portion pattern, the wavelength selection portion pattern is caught in an image acquired by an image sensor 44 (step ST1). The blue channel intensity is defined as $I_B$, as shown in FIG. 10, the red channel intensity is defined as $I_R$, as shown in FIG. 11, and these intensities are set as the ordinates of their graphs. The abscissas of the respective graphs shown in FIGS. 10 and 11 are defined as $k_{x0}*x$. Here, $k_{x0}$ is the spatial frequency of the sin wave.

Figure 12:
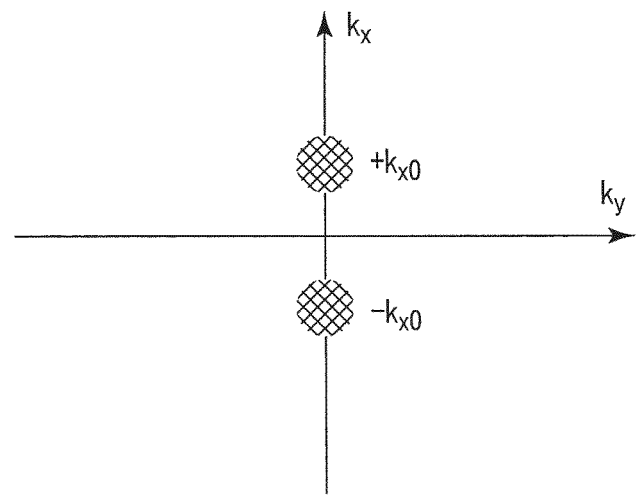
FIG. 12 is a view showing a spatial frequency image obtained by Fourier-transforming an image in which a wavelength selection portion is caught.

The processing apparatus 14 Fourier-transforms an image in which the wavelength selection portion 26 is caught and calculates a spatial frequency image. Then, the wavelength selection portion 26 can be represented as two points on the $k_x$ axis, as shown in FIG. 12. That is, the wavelength selection portion 26 can be represented as two points $+k_{x0}$ and $-k_{x0}$ on the $k_x$ axis.

If the processing apparatus 14 performs mask processing on the two points $+k_{x0}$ and $-k_{x0}$ on the $k_x$ axis, the processing apparatus 14 can remove the wavelength selection portion 26 caught in the image (step ST21). More specifically, the processing apparatus 14 sets the frequency space images in the regions of the two points $+k_{x0}$ and $-k_{x0}$ on the $k_x$ axis to 0. Alternatively, the processing apparatus 14 sets the frequency space images in the regions of the two points $+k_{x0}$ and $-k_{x0}$ to a constant value that is sufficiently small compared to the intensity (magnitude of the pixel value of the frequency space image) of the surroundings.

Since the wavelength selection portion 26 is the sin wave, the processing apparatus 14 can decrease regions subjected to mask processing to two points. As a result, the processing apparatus 14 can remove the wavelength selection portion 26 caught in the image without degrading information about a minute defect as much as possible.

Then, the processing apparatus 14 generates an image (wavelength selection portion-removed image) from which the wavelength selection portion pattern is removed. The processing apparatus 14 performs inverse Fourier transform on the frequency space image (wavelength selection portion-removed image in the frequency space) after mask processing, returning the image to the real space. The processing apparatus 14 generates a wavelength selection portion-removed image in the real space (step ST2).

In this manner, by optimizing the wavelength selection portion pattern of the wavelength selection portion 26, the processing apparatus 14 can remove the wavelength selection portion 26 caught in the image while keeping details of information of the surface of the object S.

Finally, as described in the first embodiment, the processing apparatus 14 can identify the difference of the BRDF between object points O1 and O2 using the image (image obtained by removing the wavelength selection portion pattern from the acquired image) (step ST3).

According to this embodiment, there can provide a non-transitory storage medium storing an optical inspection program, the optical inspection system 10, the processing apparatus 14 for the optical inspection system 10, and the optical inspection method for removing the image (wavelength selection portion pattern) of the wavelength selection portion 26 included in an image at the time of BRDF acquisition.

In this embodiment, the wavelength selection portion 26 is the sin wave. However, the wavelength selection portion 26 need not always be the sin wave, and if the wavelength selection portion 26 has a cyclic pattern, a spatial frequency corresponding to the cycle becomes a main component in the frequency space. Thus, the processing apparatus 14 can set regions subjected to mask processing near the two points. Thus, the processing apparatus 14 can remove the wavelength selection portion 26 caught in the image without degrading information about a minute defect as much as possible.

Fourth Embodiment (Line Sensor Type)

An optical inspection system 10 according to the fourth embodiment will be described with reference to FIG. 13. The fourth embodiment is a modification of the optical inspection system 10 according to the first, second, and third embodiments. The same members as those described in the second and third embodiments or members having the same functions are denoted by the same reference numerals as much as possible, and a detailed description thereof will appropriately be omitted.

Figure 13:
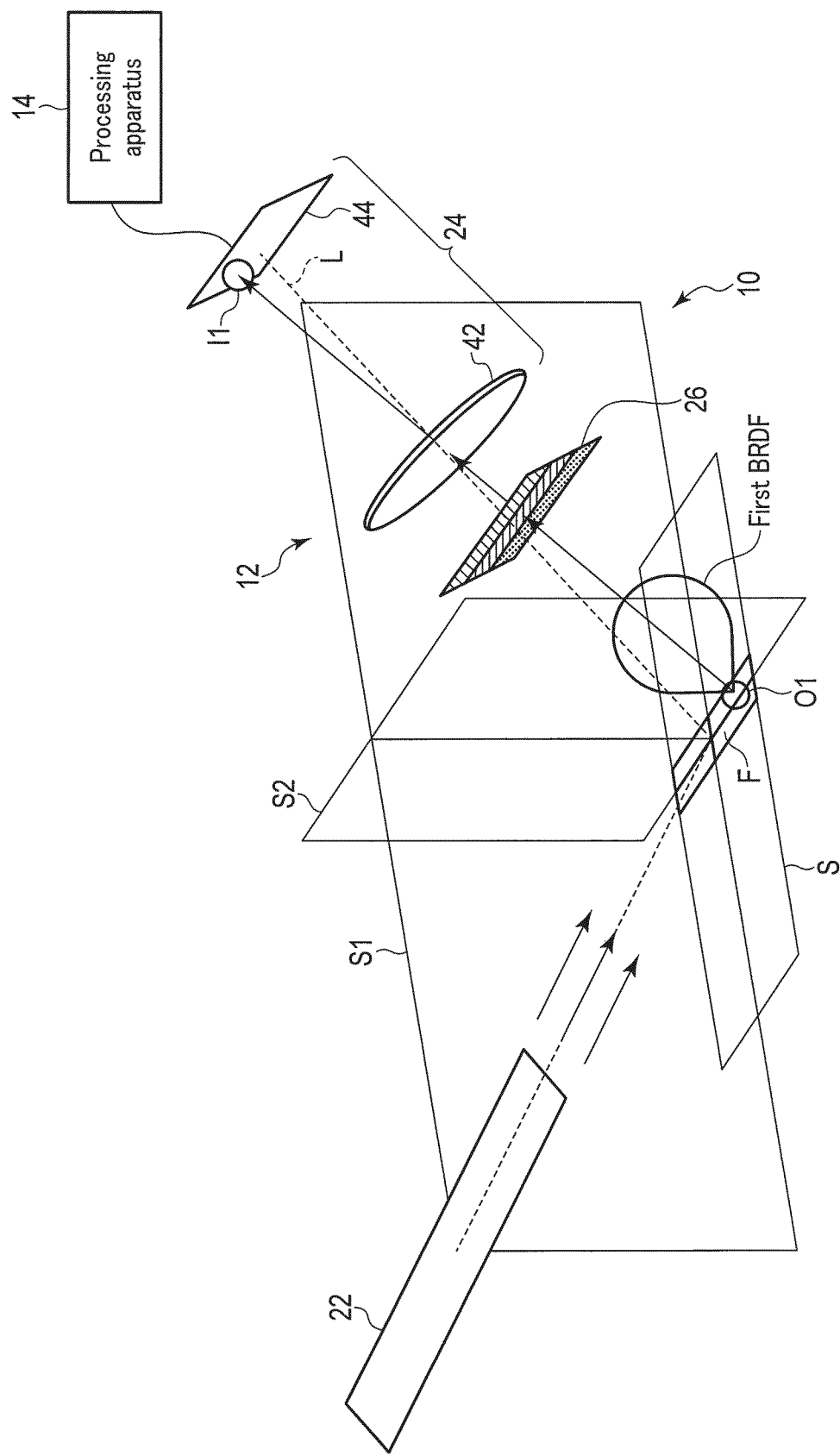
FIG. 13 is a schematic view showing an optical inspection system according to a fourth embodiment.

FIG. 13 is a perspective view showing an optical apparatus 12 of the optical inspection system 10 according to the fourth embodiment. The optical apparatus 12 in which this embodiment is projected to a first section S1 in FIG. 13 is basically the same as the optical apparatus 12 (see FIG. 4) described in the second embodiment.

First, in this embodiment, the optical apparatus 12 is constituted without using a beam splitter. That is, the number of necessary optical elements of the optical apparatus 12 can be decreased.

In this embodiment, an image sensor 44 is a line sensor, but may be an area sensor.

A section that includes the optical axis of an imaging optical element 42 and is orthogonal to the longitudinal direction of the line sensor 44 is defined as the first section S1. On the first section S1, light emitted from an illumination portion 22 is projected on this section as parallel light. To the contrary, a section orthogonal to the first section S1 is defined as a second section S2. On the second section S2, light emitted from the illumination portion 22 and projected on this section may be not parallel light but diffuse light. Here, the light is diffuse light.

A wavelength selection portion 26 includes a plurality of (for example, three) wavelength selection regions 52, 54, and 56. The wavelength selection regions 52, 54, and 56 each have a stripe shape that crosses the x-axis and is long along the y-axis. The three wavelength selection regions 52, 54, and 56 are arranged on the first section S1. That is, the wavelength selection regions 52, 54, and 56 of the wavelength selection portion 26 change along the x-axis on the section S1. In contrast, the wavelength selection regions of the wavelength selection portion 26 do not change on a section parallel to the second section S2 orthogonal to the section S1.

The illumination portion 22 illuminates the surface of an object S, forming an irradiation field F. The irradiation field F of the illumination portion 22 is formed into a linear or rectangular shape on the surface of the object S. The first object point in the irradiation field F is imaged to the first image point on the line sensor 44 by the imaging optical element 42. At the first object point, the BRDF is the first BRDF. The first light beam is included in the first BRDF.

The spread of the distribution of the first BRDF upon projecting a light beam onto the first section S1 can be identified by the wavelength spectrum of light having passed through the wavelength selection regions 52, 54, and 56 of the wavelength selection portion 26. When the light arrives at the image point I1 in the line sensor 44, the line sensor 44 identifies the light as a color corresponding to the wavelength spectrum. Hence, the processing apparatus 14 can identify the BRDF by color. If the processing apparatus 14 can acquire the BRDF, the processing apparatus 14 can identify the presence/absence of a minute defect on the surface of the object S.

This embodiment adopts a line sensor as the image sensor 44. The image sensor (line sensor) 44 has a feature in which the image of the surface of the object S during conveyance at a predetermined speed or the like in a predetermined direction can be acquired at high precision. The optical inspection system 10 according to this embodiment can be used to inspect the surface of the object S during conveyance at high precision and acquire three-dimensional shape information of the surface of the object S.

In this embodiment, the longitudinal directions of the line sensor 44 and illumination portion 22 are prolonged parallel, so the line sensor 44 can acquire the image of the surface of a wide object S. For example, the sizes of the line sensor and illumination portion in the longitudinal direction can be set to be several hundred mm to several thousand mm.

In this embodiment, the wavelength selection portion 26 is arranged in front of the imaging portion 24, and this optical system can be installed regardless of the imaging portion (that is, camera) 24. That is, in the optical inspection system 10, the range of choice of the imaging portion (camera) 24 is advantageously wide.

The wavelength selection portion 26 is supported by a support portion 72, and the support portion 72 can rotate the wavelength selection portion 26 by a first adjustment portion 74. At this time, the processing apparatus 14 can acquire a high-precision BRDF distribution by imaging the surface of the object S in accordance with rotation of the wavelength selection portion 26 corresponding to rotation of the support portion 72.

According to this embodiment, there can provide a non-transitory storage medium storing an optical inspection program, the optical inspection system 10, the processing apparatus 14 for the optical inspection system 10, and the optical inspection method for removing the image (wavelength selection portion pattern) of the wavelength selection portion 26 included in an image at the time of BRDF acquisition.

In the above-described first to fourth embodiments, an example has been explained in which the wavelength selection regions 52 and 54 (and 56) extend along the y-axis. For example, the wavelength selection regions 52 and 54 (and 56) of the wavelength selection portion 26 are preferably formed annularly. In this case, the processing apparatus 14 can remove a color added by the wavelength selection portion 26 and leave a flaw or the like by performing processing described in the first embodiment on an acquired image, or performing Fourier transform processing, proper mask processing, and inverse Fourier transform processing described in the second and third embodiments.

According to at least one of the above-described embodiments, there can provide a non-transitory storage medium storing an optical inspection program, the optical inspection system 10, the processing apparatus 14 for the optical inspection system 10, and the optical inspection method for removing the image (wavelength selection portion pattern) of the wavelength selection portion 26 included in an image at the time of BRDF acquisition.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A non-transitory storage medium storing an optical inspection program, the optical inspection program causing a processor to execute generating a wavelength selection portion-removed image by removing an image of the wavelength selection portion included in a captured image from the captured image of an object surface imaged through a wavelength selection portion configured to select at least two different wavelength spectra from incident light.

2. The medium according to claim 1, wherein the removing the image of the wavelength selection portion included in the captured image includes:
   generating the captured image in a frequency space by Fourier transform;
   generating the wavelength selection portion-removed image in the frequency space by setting a value of a frequency component corresponding to the wavelength selection portion to be constant or 0 in the captured image in the frequency space; and
   generating the wavelength selection portion-removed image in a real space by performing inverse Fourier transform on the wavelength selection portion-removed image in the frequency space.

3. The medium according to claim 1, wherein the removing the image of the wavelength selection portion included in the captured image includes applying a spatial high-pass filter to the captured image.

4. The medium according to claim 1, wherein the wavelength selection portion includes a cyclic pattern.

5. The medium according to claim 4, wherein the removing the image of the wavelength selection portion included in the captured image includes:
   generating the captured image in a frequency space by Fourier transform;
   generating the wavelength selection portion-removed image in the frequency space by setting a value of a frequency component corresponding to the wavelength selection portion to be constant or 0 at or near two points of the captured image in the frequency space; and
   generating the wavelength selection portion-removed image in a real space by performing inverse Fourier transform on the wavelength selection portion-removed image in the frequency space.

6. The medium according to claim 1, wherein the processor is caused to execute acquiring information of the object surface based on the wavelength selection portion-removed image.

7. A processing apparatus for an optical inspection system, comprising:
   a non-transitory storage medium storing an optical inspection program according to claim 1; and
   a processor configured to read out, from the non-transitory storage medium, the program stored in the non-transitory storage medium and execute the program.

8. A processing apparatus for an optical inspection system, comprising a processor configured to generate a wavelength selection portion-removed image by removing an image of the wavelength selection portion included in a captured image from the captured image of an object surface imaged through a wavelength selection portion configured to select at least two different wavelength spectra from incident light.

9. The apparatus according to claim 8, wherein the processor is configured to acquire information of the object surface based on the wavelength selection portion-removed image.

10. An optical inspection system comprising:
    a processing apparatus according to claim 8; and
    an imaging portion configured to acquire the captured image.

11. The system according to claim 10, further comprising an illumination portion configured to emit parallel light to a section including an optical axis of the imaging portion.

12. An optical inspection method comprising generating a wavelength selection portion-removed image by removing an image of the wavelength selection portion included in a captured image from the captured image of an object surface imaged through a wavelength selection portion configured to select at least two different wavelength spectra from incident light.

13. The method according to claim 12, further comprising acquiring information of the object surface based on the wavelength selection portion-removed image.

14. The method according to claim 12, wherein the removing the image of the wavelength selection portion included in the captured image includes:
    generating the captured image in a frequency space by Fourier transform;
    generating the wavelength selection portion-removed image in the frequency space by setting a value of a frequency component corresponding to the wavelength selection portion to be constant or 0 in the captured image in the frequency space; and
    generating the wavelength selection portion-removed image in a real space by performing inverse Fourier transform on the wavelength selection portion-removed image in the frequency space.

* * * * *